Sept. 27, 1932. J. C. McCUNE 1,879,704
TRACTION INCREASING DEVICE
Filed Dec. 19, 1930
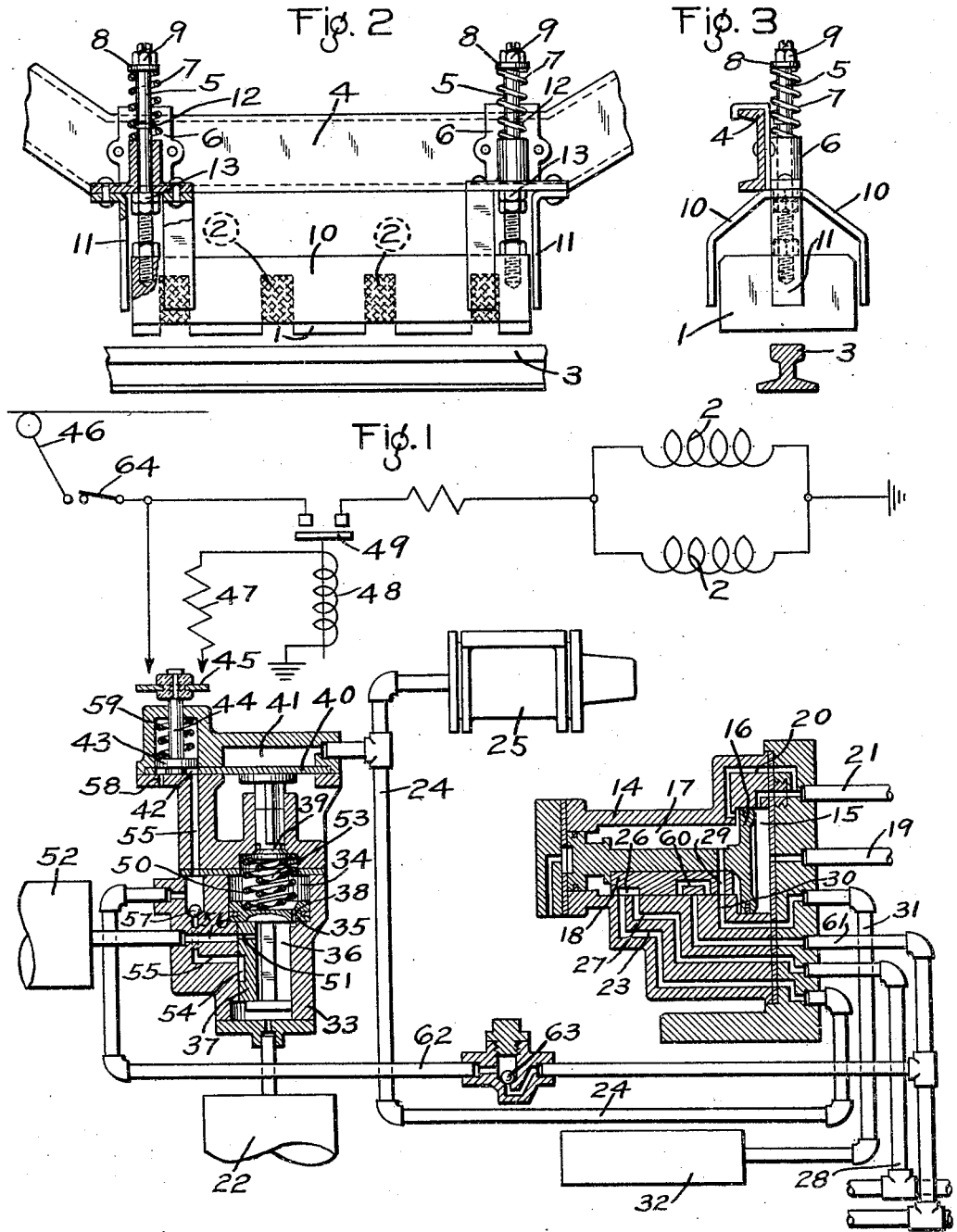
INVENTOR.
JOSEPH C. McCUNE
BY
Wm. M. Cady
ATTORNEY.

Patented Sept. 27, 1932

1,879,704

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRACTION INCREASING DEVICE

Original application filed February 5, 1929, Serial No. 337,623. Divided and this application filed December 19, 1930. Serial No. 503,476.

This invention relates to traction increasing devices, the present application being a divison of application, Serial No. 337,623, filed February 5, 1929.

The principal object of the invention is to employ a traction increasing device to increase the traction of the wheels on the rails, so that when the brakes are applied, a greater braking force can be employed, without causing the wheels to skid.

In the accompanying drawing; Figure 1 is a diagrammatic view, partly in section, of an apparatus embodying my invention; Fig. 2 a side elevation of the traction increasing magnet device as applied to a car truck; and Fig. 3 an end view of the construction shown in Fig. 2.

As shown in Fig. 2, a magnet 1 having coils 2 is suspended above each rail 3, the magnet being supported from the truck frame member 4 by rods 5, which extend through bores in brackets 6, mounted on the member 4.

The magnet is yieldingly maintained away from the rails by springs 7, which surround the rods 5 and are interposed between the brackets 6 and washers 8, which are held in place by nuts 9. The magnet 1 is mounted between guide members 10, secured to the brackets 6, and adapted to guide the magnet laterally, and endwise movement of the magnet is prevented by guide members 11, also secured to the brackets 6.

Downward movement of the magnet is limited by stop rings 12, secured to the rods 5, so that the magnet is prevented from moving into engagement with the rail.

The springs 7 are under initial tension and upward movement of the magnet is limited by nuts 13 on the rods 5, the nuts being adapted to engage the under face of the brackets 6. The normal spacing between the magnet and the rail may be adjusted to the desired degree by adjusting the nuts 13.

My invention may be employed in connection with a safety car control equipment having an emergency valve device 14 comprising a casing having a piston chamber 15 containing a piston 16 and a valve chamber 17 containing a slide valve 18 adapted to be operated by piston 16.

The piston chamber 15 is connected to the usual brake pipe 19 and the valve chamber 17 is connected through passage 20 with pipe 21 which leads to the usual main reservoir 22. The passage 23, leading to the seat of slide valve 18, is connected to a pipe 24, which leads to the brake cylinder 25.

In the release position of slide valve 18, passage 23 is connected, through cavity 26, with passage 27 which leads to the usual straight air pipe 28. Also, in release position, port 29 registers with a passage 30, leading to the pipe 31, through which the usual sanding reservoir 32 is charged with fluid under pressure.

According to my invention, means are provided for controlling the opening and closing of the circuit for energizing the coils of the magnet 1 and comprising a casing 33 having a piston chamber 34 containing a piston 35 and a valve chamber 36 containing a slide valve 37 adapted to be operated by piston 35. The valve chamber 36 is connected to the main reservoir 22 and piston 35 has a restricted port 38 through which piston chamber 34 is charged with fluid under pressure.

A valve 39 controls the venting of fluid under pressure from piston chamber 34 and is adapted to be operated by a flexible diaphragm 40, having chamber 41 at one side connected to the brake cylinder pipe 24. Mounted in piston chamber 42 is a piston 43 having a stem 44 which carries a disk contact member 45.

When piston 43 is moved upwardly, the contact member closes a circuit from a source of current, such as the trolley 46, through a suitable resistance coil 47, to a magnet coil 48 and when the magnet coil 48 is energized, a contact member 49 is actuated to close a circuit for energizing the magnet coils 2 of the traction increasing magnet 1.

In operation, when the brake pipe 19 is charged wtih fluid under pressure, the piston 16 of the emergency valve device 14 is held in release position and the sanding reservoir 32 is charged with fluid under pressure through port 29. With the valve 39 seated, fluid pressure equalizes from valve chamber 36 through the restricted port 38 into piston chamber 34, permitting spring 50 to maintain piston 35 in its inner position, in which a port 51, through slide valve 37, connects the valve chamber 36 with a timing reservoir 52, so as to charge the timing reservoir with fluid under pressure.

When the brakes are applied by supplying fluid under pressure to the straight air pipe 28, in the usual manner, fluid under pressure is supplied from the straight air pipe through cavity 26 in slide valve 18 to pipe 24 and the brake cylinder 25. Fluid under pressure is also supplied from pipe 24 to chamber 41 and when the fluid pressure in said chamber has been increased to a degree sufficient to overcome the pressure of spring 53, the diaphragm 40 is shifted downwardly, so as to unseat the valve 39.

Fluid is then vented from piston chamber 34, so that piston 35 is shifted upwardly by the fluid pressure in valve chamber 36. The valve 37 is also shifted, so that cavity 54 connects passage 55 with a passage 56. Fluid under pressure is then supplied from the timing reservoir 52, past the ball check valve 57 to piston chamber 42.

Piston 43 is thereupon shifted upwardly so that the contact member 45 closes the circuit to the magnet coil 48. The energization of the magnet coil then causes the contact member 49 to close the circuit for supplying current to the magnet coils 2.

The magnet 1 being then energized, is moved toward the rail 3 by magnetic pull, the magnet being prevented from engaging the rail by the engagement of the collars 12 with the upper ends of the brackets 6.

Fluid under pressure supplied to piston chamber 42 gradually vents to the atmosphere through a restricted port 58, until the pressure in the timing reservoir 52 and in piston chamber 42 has been reduced sufficiently to permit the piston 43 to be moved downwardly by the spring 59. The circuit of magnet coil 48 is then opened and the coil 48 being deenergized, the contact member 49 is moved to open the circuit of the magnet coils 2.

By this means, the time in which the traction increasing magnet coils 2 are energized is limited in each brake application, so as to prevent the possible burning out of the coils, in case the brakes should be left applied for too long a period.

If the piston 16 is shifted to the right by a reduction in pressure in the brake pipe 19, due to the operation of the safety car control apparatus, or otherwise, the brakes will be applied due to the uncovering of passage 23 by the movement of slide valve 18. Fluid under pressure being then supplied from the valve chamber 17 and the main reservoir 22 to pipe 24 and the brake cylinder 25.

Cavity 60 in slide valve 18 also connects pipe 31 with sanding pipe 61, so that fluid under pressure is supplied from the sanding reservoir 32 to the sanding pipe 61, to effect the sanding of the rails in the usual manner.

A pipe 62 connects sanding pipe 61 with passage 55, above the check valve 57, so that when fluid under pressure is supplied to the sanding pipe, fluid is also supplied to piston chamber 42. It is therefore apparent that the magnet coils 2 will be energized to increase the traction whenever an emergency application of the brakes is effected by operation of the emergency valve device 14.

It will also be noted that the piston 43 will be operated in an emergency application of the brakes, even though the timing reservoir 52 has been blown down during a previous straight air application of the brakes. A check valve 63 is interposed in pipe 62 to prevent back flow from passage 55, when fluid under pressure is supplied from the timing reservoir 52 to said passage.

A hand operated switch 64 may be provided, to permit the opening of the circuit to the traction increasing magnet coils 2, when it is not desired that the traction increasing feature should function.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a traction increasing apparatus for rail vehicles, the combination with a magnet supported on the vehicle above the rail and adapted when energized to cooperate with the rail to increase the traction of the vehicle on the rail, said magnet being constantly maintained out of contact with the rail, of a switch device operated by fluid under pressure for effecting the energization of said magnet, a reservoir normally charged with fluid under pressure, means operated upon applying the brakes for supplying fluid under pressure from said reservoir to said switch device, and means for venting fluid from said reservoir at a predetermined rate.

2. In a traction increasing apparatus for rail vehicles, the combination with a magnet supported on the vehicle above the rail, of means for effecting a straight air application of the brakes and for effecting an emergency application of the brakes, a reservoir, a switch device operated by fluid under pressure for effecting the energization of said magnet, means operated upon a service application of the brakes for supplying fluid under pressure from said reservoir to said switch devices, an additional reservoir, and means for supplying fluid under pressure from said additional reservoir to said switch device upon effecting an emergency application of the brakes.

In testimony whereof I have hereunto set my hand, this 17th day of December, 1930.

JOSEPH C. McCUNE.